2,913,497
Patented Nov. 17, 1959

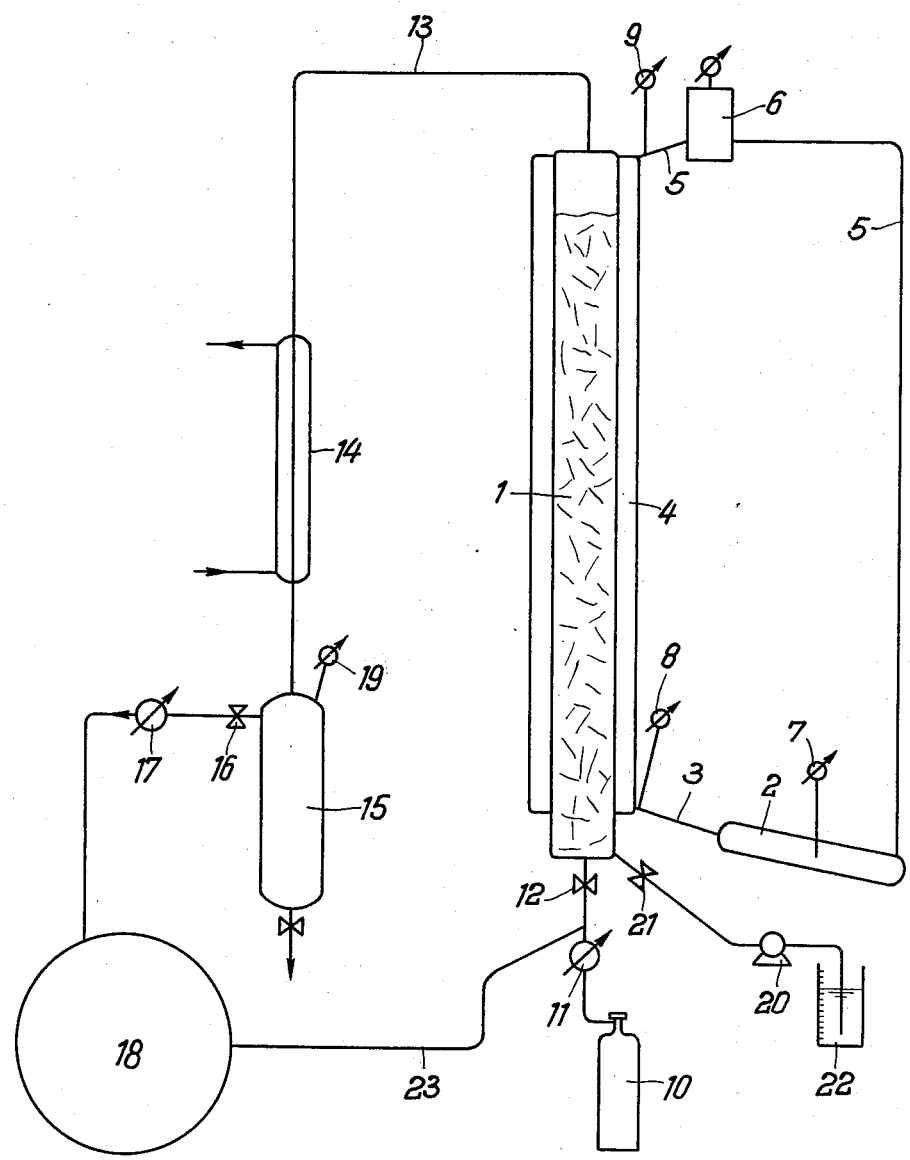

2,913,497
PREPARATION OF KETONES FROM KETOLS

Walter Grimme, Moers-Utfort, and Helmut Schwarzhans and Johannes Wöllner, Moers, Germany, assignors to Rheinpreussen Aktiengesellschaft für Bergbau und Chemie, Homberg (Lower Rhine), Germany, a German corporation Application September 1, 1954, Serial No. 453,559

Claims priority, application Germany June 19, 1954

5 Claims. (Cl. 260—593)

This invention relates to improvements in the preparation of ketones. The invention more particularly relates to a method for the preparation of ketones by the catalytic reduction of ketols.

The preparation of ketones is conventionally effected by the dehydrogenation or oxidation of secondary alcohols. Ketones may also be produced by the decompositions of calcium salts of fatty acids.

In order to prepare ketones of a complicated structure, it was previously necessary to react acid chlorides or nitriles with Grignard reagents or to effect a condensation of carboxylates with compounds containing reactive methylene or methyl groups.

One object of this invention is a new, simplified method for the preparation of the ketones. This, and still further objects will become apparent from the following description:

It has now been found, in accordance with the invention, that ketones may be readily produced by reducing an aliphatic β-ketol with hydrogen at elevated pressures in the presence of a catalyst having a dehydrating and hydrogenating action.

Very surprisingly, the reduction merely takes place at the methylol group with the keto group remaining intact.

The reduction of the ketols in accordance with the invention is dependent upon the temperature and the pressure used. The reduction will commence at a temperatures of about 100° C. and may be effected at temperatures of up to 200° C. An increase in temperature of above 200° C. is inadvisable, inasmuch as the same causes injurious side reactions to occur, such as the formation of diols. Temperatures ranging between 140 and 170° C. have been found preferable.

At low pressures, practically no diol is formed. With increasing pressures the tendency to the formation of diols increases. The reduction may be carried out at a hydrogen partial pressure of between 1 and 100 atmospheres, and preferably a pressure between 10 and 20 atmospheres at which the reduction proceeds at a satisfactory velocity without any substantial quantities of diols being formed.

The process according to the invention finally results in a reduction of the $CH_2$—OH group to the methyl group. However, the reaction takes place in two stages. Water is separated in the first stage, converting the keto-alcohol (ketol) to a vinyl ketone, whereupon, in the second stage, the methylene group formed is hydrogenated to the methyl group.

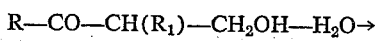 
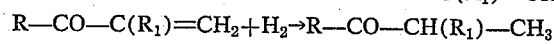

From this course of the reaction it becomes evident that the catalysts suitable for the reaction must have both a dehydrating and a hydrogenating effect. Moreover, the hydrogenating quality of the catalyst must be selectively aimed at the hydrogenation of the olefinic double bond in order to prevent a simultaneous hydrogenation of the carbonyl group to the secondary alcohol group.

As catalysts for the reaction there may be used any conventional catalysts which have a known dehydrating hydrogenating action. Suitable catalysts include catalysts consisting of mixed metal oxides such as copper oxide-chromium oxide or zinc oxide-chromium oxide, or combinations of dehydrating and hydrogenating catalysts such as aluminum oxide, silica gel, kieselguhr or pumice stone on the one hand, and nickel, platinum or palladium catalysts on the other hand. The catalysts can be arranged in a fixed bed, as for example, in the tubes of a tube furnace, or else may be suspended in the ketol, which is to be converted. Furthermore, the walls of the vessel in which the reaction is effected may be coated with catalytically active material.

Depending on the type of catalyst used, the quantity of catalyst required amounts to 0.1–20% by weight of the quantity of keto-alcohol employed. When using noble metal catalysts, however, it is sufficient to employ quantities of 0.1–2% by weight in additive combination with 5–10% by weight of dehydration catalysts, while it is preferable to use 5–10% by weight if the catalyst exclusively consists of mixed metallic oxides, such as copper oxide-chromium oxide.

As the starting ketols there are used aliphatic β-ketols with 4 to 6 carbon atoms which contain the hydroxy group in the 1-position and the keto group in the 3-position, such as 3-ketobutanol-(1)

$$CH_3—CO—CH_2—CH_2OH$$

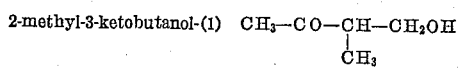

or

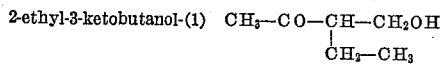

It has been found particularly advisable to use as the starting ketols for the catalytic reduction in accordance with the invention, ketols which have been obtained by the condensation of ketones with formaldehyde, as, for example, in accordance with U.S. patent application Serial No. 429,694, filed May 13, 1954.

The ketols obtained in this manner are characterized by particular purity, as the result of which the preparation of the ketones in accordance with the invention is greatly facilitated, since the possibility of disturbing side reaction is reduced.

The method in accordance with the invention may be carried out continuously in a simple manner. For this purpose there may be used known apparatuses in connection with which the reaction takes place in the liquid phase, as, for example, the reaction apparatus for carrying out the Fischer-Tropsch synthesis in the liquid phase.

A continuous-type apparatus for carrying out the process according to the invention is shown in the diagrammatic drawing.

The reactor 1 is heated by means of a heat carrier passed in closed circuit. The heat carrier, such as diphenyl, is heated with gas in the heating vessel 2. Through the pipe 3, it passes into the heating jacket 4. After leaving the heating jacket at the top, it returns to the heating vessel 2 via pipe 5 and the equalizer 6. 7, 8 and 9 are temperature measuring points. From the hydrogen cylinder 10, hydrogen passes through the pressure-reducing valve 11 and the valve 12 to the reactor which is almost completely filled with a catalyst suspension agitated by the hydrogen stream. The tail gas leaves the reactor through the pipe 13 and is cooled in the cooler 14. While the condensable reaction products are retained in the receiver 15, the tail gas, essentially consisting of unspent hydrogen, is passed to the gas tank 18 via the expansion valve 16, which also serves as a flow control valve, and the gas meter 17. The pressure gauge 19 indicates the pressure in the reactor. In correspondence with the condensable reaction products obtained for each quarter of an hour, fresh ketone alcohol from the storage tank 22 is fed to the reactor by means of the pump 20 through the valve 21. Hydrogen from the gas tank 18 is returned to the reactor 1 through the pipe 23 via the valve 12.

This continuous method of operation is superior to batch operation, due to its simplicity, and inasmuch as the time-consuming filling and removing, heating and cooling as well as the difficult separation of the catalyst from the reaction product are dispensed with.

It is well known that ketols may be hydrogenated catalytically into diol compounds. It was furthermore known that ketones would be reduced in the presence of copper-chromium oxide catalysts into secondary alcohols. It was therefore completely unexpected that under the reaction conditions in accordance with the invention the hydrogenation of the vinyl groups formed as an intermediate stage by the splitting off of water is possible without simultaneous change of the ketone group.

The following examples are given to further illustrate the invention and not to limit the same:

*Example 1*

There was used a copper-chromite catalyst which was prepared as follows: From a solution of 50 grams copper nitrate, 5.4 grams barium nitrate, and 77 grams chromium nitrate in 575 cc. water, the metal carbonates were precipitated by the addition of a solution of 100 grams of ammonium carbonate in 400 cc. water. The precipitate was removed by suction filtering, washed twice with 50 cc. portions of water, dried at 100–110° C., pulverized and decomposed at 230° C.

130 grams 3-keto-butanol-(1) and 13 grams of the above described catalyst were placed in a heatable vibratory autoclave. After the introduction of hydrogen up to a pressure of 40 atm. gauge, the autoclave was heated to 150° C. with continuous shaking and thereupon kept at 150° 160° C. After 1½ hours the pressure in the autoclave dropped to 18.7 atm. gauge. After complete cooling, the pressure of the autoclave was reduced and the reaction mixture separated from the catalyst. The reaction mixture contained 77% by volume of methylethylketone, corresponding to a conversion of approximately 93%.

*Example 2*

447 grams 2-methyl-3-keto-butanol-(1) and 45 grams of a copper chromite catalyst which had already been used for three hydrogenations were placed in the autoclave. After introduction of hydrogen to a pressure of 30 atm. gauge, the autoclave was heated with constant shaking to 150° C. and a temperature of 150 to 160° C. was then maintained. After the total pressure in the autoclave had dropped to 20 atm. gauge, hydrogen was repeatedly added until the total pressure was 45 atm. gauge. After heating for a further 3½ hours to 150°–160° C. the reaction was complete. After complete cooling, the pressure of the autoclave was reduced and the autoclave emptied. The liquid reaction mixture separated from the catalyst and was subjected to fractional distillation. There was obtained 61% by volume methyl-isopropyl-ketone and 14.5% by volume unreacted 2-methyl-3-ketobutanol-(1). Referred to the ketol used for the reaction, the yield of methyl-isopropyl-ketone corresponds to a yield of 84%. This example shows the long life of the catalyst used.

*Example 3*

20 grams of 2-methyl-3-ketobutanol-(1) are subjected to dehydrating hydrogenation, as described in Example 1, at 170–180° C. in the presence of 2 grams of finely powdered pumice and 0.5 gram of palladium coal containing 10% by weight of palladium, resulting in the formation of 15.2 grams of methyl-isopropyl-ketone (88% of the theory).

*Example 4*

204 grams of 2-methyl-3-ketobutanol-(1) (2 moles) are converted to methyl-isopropyl-ketone using 30 grams of ZnO—Cr$_2$O$_3$ catalyst at 150–160° C. and at a hydrogen pressure of 15–25 atmospheres, as described in Example 1. The methyl-isopropyl-ketone yield obtained is 160 grams (93% of the theory).

*Example 5*

232 grams (2 moles) of a mixture of 2-ethyl-3-ketobutanol-(1) and 2-methyl-3-ketopentanol-(1), such as is obtained by the methylolation of a mixture of methyl-propyl-ketone and diethylketone, are treated according to Example 1 in a heated shaking autoclave in the presence of 18.5 grams of copper chromite catalyst at 160° C. and 15–20 atmospheres hydrogen pressure. After 15 hours, the calculated quantity of hydrogen has been absorbed. The reaction product separates into two layers. Upon purification, the top layer supplies 188 grams (94.0% of the theory) of a mixture of ethyl-isopropyl-ketone and 3-methyl-pentanone-(2).

*Example 6*

This experiment was carried out in the continuous-type apparatus described above, using the copper chromite catalyst already mentioned. 500 grams of catalyst and 5 liters of 2-methyl-3-ketobutanol-(1) were filled into the reactor. After preheating to 150–160° C., hydrogen at 5 atm. pressure was passed through the reactor at the rate of 135 normal liters per hour. According to the pressure in the reactor, the tail gas rate was so adjusted as to keep the hydrogen flow through the reactor practically constant. Fresh methyl-keto-butanol was continually fed to the reactor in correspondence with the quantity of condensable reaction products obtained. 950 cc. of methyl-isopropyl-ketone were produced per hour. After 75 operating hours, the activity of the catalyst was unchanged.

No considerable difference in the quantity of reaction products obtained per hour is noted when increasing the pressure to as much as 13 atm. When the pressure is increased, the quantity of tail gas escaping per hour should also be increased, a rate of 300 normal liters per hour being preferable at a pressure of 11 atm. in the reactor. In the case of pressure variations in the reactor, the quantity of tail gas leaving the reactor is so adjusted, according to the momentary pressure in the reactor, that the flow velocity of the hydrogen through the reactor is maintained at a practically constant level.

We claim:

1. Method for the preparation of ketones, which comprises contacting an aliphatic β-ketol having from 4–6 carbon atoms in its chain, having the hydroxyl group in the 1-position and the keto group in the 3-position with hydrogen at a hydrogen partial pressure of 1–100 atmospheres and a temperature of about 100–200° C. in the presence of a copper chromite catalyst, and recovering the ketone corresponding to the starting ketol which is formed.

2. Method according to claim 1, in which said contacting is effected at a temperature between 140 and 170° C.

3. Method according to claim 1, in which said contacting is effected at a hydrogen partial pressure of between about 10 and 20 atmospheres.

4. Method according to claim 1, in which said contacting is effected by suspending the catalyst in the ketol, substantially continuously passing a stream of hydrogen containing an excess of hydrogen through the suspension, removing the ketone and water formed with the stream of hydrogen and substantially continuously adding a quantity of fresh ketol corresponding to the quantity of ketone and water removed.

5. Method according to claim 4, which includes recycling the hydrogen after the removal of the ketone and water therefrom.

References Cited in the file of this patent

UNITED STATES PATENTS

| | | |
|---|---|---|
| 2,077,421 | Lazier | Apr. 20, 1937 |
| 2,139,360 | Fairbairn et al. | Dec. 6, 1938 |
| 2,499,172 | Smith | Feb. 28, 1950 |
| 2,802,876 | Broich et al. | Aug. 13, 1957 |